United States Patent
Niitsuma et al.

(10) Patent No.: US 6,879,452 B2
(45) Date of Patent: Apr. 12, 2005

(54) MASTER INFORMATION CARRIER FOR MAGNETIC TRANSFER

(75) Inventors: Kazuhiro Niitsuma, Kanagawa-ken (JP); Masakazu Nishikawa, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 85 days.

(21) Appl. No.: 10/322,437

(22) Filed: Dec. 19, 2002

(65) Prior Publication Data

US 2003/0117736 A1 Jun. 26, 2003

(30) Foreign Application Priority Data

Dec. 20, 2001 (JP) ........................................ 2001-387814

(51) Int. Cl.$^7$ .............................................. G11B 5/86
(52) U.S. Cl. ...................................................... 360/16
(58) Field of Search ............................ 360/16, 17, 15, 360/55; 369/16

(56) References Cited

U.S. PATENT DOCUMENTS

| | | |
|---|---|---|
| 5,075,801 A | 12/1991 | Chi et al. |
| 6,469,848 B1 * | 10/2002 | Hamada et al. ............... 360/17 |
| 6,570,724 B1 * | 5/2003 | Komatsu et al. .............. 360/17 |
| 6,602,301 B1 * | 8/2003 | Komatsu et al. .............. 360/17 |
| 6,646,820 B1 * | 11/2003 | Ishida et al. .................. 360/17 |
| 6,650,490 B2 * | 11/2003 | Nishikawa .................... 360/17 |

FOREIGN PATENT DOCUMENTS

| | | |
|---|---|---|
| EP | 1 258 866 A2 | 11/2002 |
| EP | 1 271 486 A2 | 1/2003 |
| JP | 10-269568 | 10/1998 |

* cited by examiner

*Primary Examiner*—Sinh Tran
*Assistant Examiner*—Fred F. Tzeng
(74) *Attorney, Agent, or Firm*—Sughrue Mion, PLLC

(57) ABSTRACT

A master information carrier includes a base sheet provided with a pattern representing a signal and a magnetic layer formed on the pattern. A transfer magnetic field is applied to a slave medium in a close contact with the master information carrier to magnetically transfer the signal from the master information carrier to the slave medium. The coefficient of thermal expansion of the base sheet of the master information carrier is in the range of $5 \times 10^{-6}/°$ C. to $25 \times 10^{-6}/°$ C., and the thermal expansion difference in different directions of the base sheet of the master information carrier is not larger than $8 \times 10^{-6}/°$ C.

5 Claims, 1 Drawing Sheet

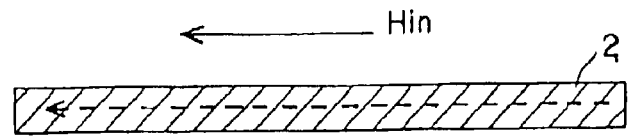
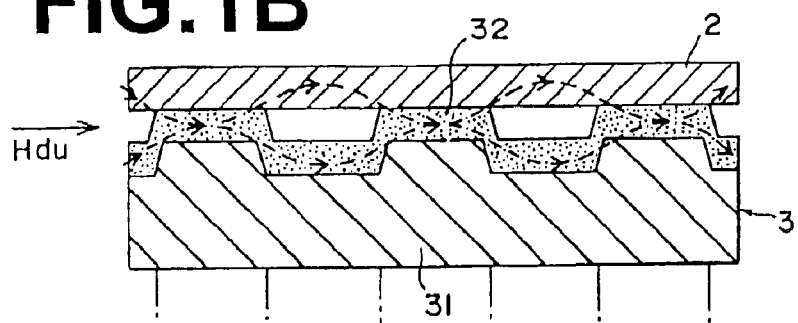
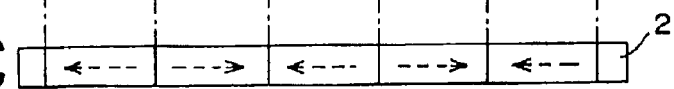
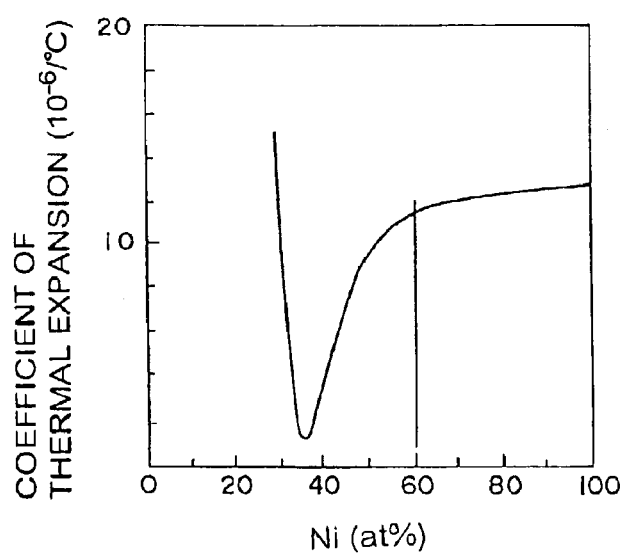

MASTER INFORMATION CARRIER FOR MAGNETIC TRANSFER

BACKGROUND OF THE INVENTION

1. Field of the Invention

This invention relates to a master information carrier carrying thereon information to be transferred to a slave medium.

2. Description of the Related Art

In the magnetic transfer, the magnetization pattern representing information (e.g., servo information) carried by a master information carrier is magnetically transferred from the master information carrier to a slave medium by applying a transfer magnetic field to the slave medium and the master information in close contact with each other. (See, for instance, Japanese Unexamined Patent Publication No. 10(1998)-269568)

The master information carrier employed in the magnetic transfer comprises a base sheet of, for instance, silicon or glass and an irregularity pattern which is formed on the base sheet by a magnetic material through photo-fabrication, sputtering or etching and represents the information to be transferred.

It has been proposed to form a master information carrier by photolithography which has been employed in the field of semiconductor or a stamper method which has been employed for producing an optical disc stamper.

It is important in the magnetic transfer that the signal transferred to the slave medium by the magnetic transfer can be accurately read by a recording and reproducing drive in which the slave medium is loaded.

From this viewpoint, it is necessary to enhance the transferred signal positioning accuracy by accurately positioning the slave medium and the master information carrier with respect to each other and that positioning accuracy of the transferred signal is such as to ensure that the transferred signal is positioned in an area where the drive can read the signal even if the master information carrier and/or the slave medium is deformed by the temperature change upon magnetic transfer.

The slave medium is generally a flexible disc or a hard disc. The base sheet of the flexible disc is generally of plastic film such as of PET, PEN or aramid whereas the base sheet of the hard disc is of a hard sheet such as of glass or aluminum. The coefficient of thermal expansion of the base sheet of the slave medium is as required by the drive.

The dimensions of the master information carrier change with the difference between the environmental temperature when the irregularity pattern is formed (mastering) and the environmental temperature when the signal is transferred to the slave medium, which changes the position of the signal transferred to the slave medium. In order to fix the position of the signal transferred to the slave medium, it is necessary to control the environmental temperature during magnetic transfer. However, to strictly control the temperature during the steps including the magnetic transfer is difficult and adds to the cost.

That is, resist is coated on a silicon sheet, the silicon sheet coated with the resist is imagewise exposed to an electron beam, and then the silicon sheet is developed and washed, thereby forming an original master bearing thereon a pattern representing information to be transferred to slave media (mastering step). Thereafter, the original master is plated with Ni or the like, whereby a base sheet bearing thereon a duplicate of the pattern on the original master is formed. Thereafter, the base sheet is stamped in a desired size and a magnetic layer is formed on the surface of the pattern, thereby obtaining a master information carrier.

The thickness of the resist layer and distribution of the thickness of the resist layer in the mastering step correspond to the depth of the irregularity pattern on the final master information carrier and the position of the resist exposed to the electron beam determines the regular disc position in which the slave medium is to be positioned. Accordingly, the thickness of the resist layer and the position of the resist exposed to the electron beam must be accurately controlled. For this purpose, it is necessary to use a temperature control system which controls the environmental temperature within 25° C.±0.1° C., which result in high initial cost.

Further, in the magnetic transfer step where a transfer magnetic field is applied to the master information carrier and the slave medium in close contact with each other, the temperature inside the magnetic transfer apparatus tends to rise due to repeated continuous magnetic transfer. This is caused by heat generated by various systems of the magnetic transfer apparatus itself and/or heat generated by repeatedly bringing the master information carrier and the slave medium into close contact with each other. When the temperature inside the magnetic transfer apparatus rises, also the temperature of the master information carrier held by the master holder of the magnetic transfer apparatus rises.

If the temperature change can be held within ±0.1° C. during steps including the magnetic transfer step, there arises no problem. However, in order to realize such a strict temperature control, high initial cost is required. Practically, the temperature change can reach ±2.5° C. a day, and about ±5° C. a year, and it is required that the thickness of the resist layer and the position of the resist exposed to the electron beam can be accurately controlled in spite of a temperature change to such an extent.

The slave medium, e.g., a hard disc, flows in sequence along a line including a varnishing step, a magnetic transfer step and the like after the magnetic layer is formed on the base sheet by sputtering or the like. While conveyed along the line, the temperature of the slave medium becomes substantially equal to that of the master information carrier immediately before reaching the magnetic transfer step though depending upon the manufacturing speed and/or the length of the line.

However to strictly control the temperature by accurately controlling the temperature of the overall line including the magnetic transfer step and/or suppressing the systems from generating heat is difficult to put into practice. Accordingly, when, for instance, the environmental temperature during the magnetic transfer step is 30° C., the temperature difference from the mastering step becomes as large as 5° C. and the master information carrier becomes different in dimensions due to thermal expansion from the original master produced at 25° C.

Also the base sheet of the slave medium (for instance, of aluminum or glass in the case of a hard disc, and PET film or the line in the case of a flexible disc) thermally expands during the magnetic transfer step, and when the signal is transferred in this state, the position of the transferred signal on the slave medium is shifted from the correct position where the transferred signal is to be positioned due to the difference between the coefficients of thermal expansion.

SUMMARY OF THE INVENTION

In view of the foregoing observations and description, the primary object of the present invention is to provide an improved master information carrier for magnetic transfer which allows to ensure the positioning accuracy of the transferred signal irrespective of thermal expansion and/or thermal deformation of the master information carrier during the magnetic transfer without strictly controlling the environmental temperature.

In accordance with the present invention, there is provided a master information carrier which comprises a base sheet provided with a pattern representing a signal and a magnetic layer formed on the pattern and is for transferring the signal to a slave medium in a close contact with the master information carrier, wherein the improvement comprises that the coefficient of thermal expansion of the base sheet of the master information carrier is in the range of $5 \times 10^{-6}/°$ C. to $25 \times 10^{-6}/°$ C., and the thermal expansion difference in different directions of the base sheet of the master information carrier is not larger than $8 \times 10^{-6}/°$ C.

In this specification, "the thermal expansion difference in different directions of the base sheet of the master information carrier" means the difference between a maximum coefficient of thermal expansion and a minimum coefficient of thermal expansion in various directions parallel to the surface of the master information carrier to be brought into contact with the slave medium.

Preferably the coefficient of thermal expansion of the base sheet of the master information carrier is in the range of $10 \times 10^{-6}/°$ C. to $15 \times 10^{-6}/°$ C.

When the base sheet of the master information carrier is of pure Ni or Ni—Co containing therein a slight amount of Co, the coefficient of thermal expansion of the base sheet of the master information carrier is stabilized at about $13 \times 10^{-6}/°$ C.

When the base sheet of the master information carrier is of Fe—Co—Ni containing therein 60% or more of Ni, the coefficient of thermal expansion of the base sheet of the master information carrier is stabilized at about $12 \times 10^{-6}/°$ C.

It is further preferred that the ratio B/A of the coefficient B of thermal expansion of the base sheet of the slave medium to the coefficient A of thermal expansion of the base sheet of the master information carrier be in the range of 0.3 to 2.1.

When the coefficient of thermal expansion of the base sheet of the master information carrier is in the range of $5 \sim 25 \times 10^{-6}/°$ C., and the thermal expansion difference in different directions of the base sheet of the master information carrier is not larger than $8 \times 10^{-6}/°$ C., shift of the position of the transferred signal on the slave medium from the correct position where the transferred signal is to be positioned due to the difference between the coefficients of thermal expansion and the temperature difference between the mastering step and the magnetic transfer step can be suppressed, whereby the positioning accuracy of the transferred signal can meet the requirement of the drive without strictly controlling the environmental temperature during the magnetic transfer step, which results in improved reliability of reading the transferred signal and lower cost.

When the ratio B/A of the coefficient B of thermal expansion of the base sheet of the slave medium to the coefficient A of thermal expansion of the base sheet of the master information carrier is in the range of 0.3 to 2.1, that is, when the coefficient of thermal expansion of the base sheet of the slave medium and the coefficient of thermal expansion of the base sheet of the master information carrier approximate each other, more accurate magnetic transfer can be realized.

BRIEF DESCRIPTION OF THE DRAWINGS

FIGS. 1A to 1C are views for illustrating steps of magnetic transfer employing a master information carrier in accordance with an embodiment of the present invention, and FIG. 2 is a view showing the relation between the coefficient of thermal expansion and the Ni atom concentration in FeCoNi alloy.

DESCRIPTION OF THE PREFERRED EMBODIMENTS

Basic steps of magnetic transfer to an in-plane magnetic recording medium will be described with reference to FIGS. 1A to 1C, hereinbelow.

An initial magnetostatic field Hin is first applied to the magnetic layer (not shown) on the base sheet of the slave medium 2 in one direction parallel to the recording tracks thereof, thereby magnetizing the magnetic layer 2b of the slave medium 2 in an initial magnetization (DC erasure) as shown in FIG. 1A. Thereafter, the magnetic layer 32 on the upper surface of the protruding portions of the irregularity pattern on the surface of the base sheet 31 of the master information carrier 3 is brought into a close contact with the recording surface of the slave medium 2. In this state, a transfer magnetic field Hdu is applied in the direction opposite to the initial magnetic field Hin as shown in FIG. 1B, thereby magnetically transferring the information on the master information carrier 3 to the slave medium 2. Since the transfer magnetic field Hdu is absorbed in the magnetic layer 32 on the upper surface of the protruding portions of the irregularity pattern on the surface of the base sheet 31 and accordingly, the magnetic field is not reversed at portions opposed to the protruding portions and is reversed at portions not opposed to the protruding portions. As a result, magnetization pattern corresponding to the irregularity pattern on the master information carrier 3 is transferred to the tracks of the slave medium 2 as shown in FIG. 1C.

The master information carrier 3 is generally disc-shaped and has an irregularity pattern of magnetic layer 32 representing information such as a servo signal on one side thereof. The master information carrier 3 is brought into a close contact with the slave medium 2 with the other side thereof held by a holder (not shown). Sometimes a pair of master information carriers are simultaneously brought into a close contact with the opposite sides of the slave medium to transfer information to the opposite sides of the slave medium at one time, and sometimes, a master information carrier is brought into a close contact with one side of the slave medium and then another master information carrier is brought into a close contact with the other side of the slave medium to transfer information to the opposite sides of the slave medium in sequence.

The coefficient of thermal expansion of the base sheet 31 of the master information carrier 3 is in the range of $5 \sim 25 \times 10^{-6}/°$ C. (preferably in the range of $10 \sim 15 \times 10^{-6}/°$ C.), and the difference between a maximum coefficient of thermal expansion and a minimum coefficient of thermal expansion in various directions parallel to the surface of the master information carrier 3 to be brought into contact with the slave medium 2 is not larger than $8 \times 10^{-6}/°$ C.

Further the ratio B/A of the coefficient B of thermal expansion of the base sheet of the slave medium 2 to the coefficient A of thermal expansion of the base sheet 31 of the master information carrier 3 is set in the range of 0.3 to 2.1.

That is, the coefficient of thermal expansion of the base sheet of the slave medium 2 and the coefficient of thermal expansion of the base sheet 31 of the master information carrier 3 approximate each other.

When the base sheet 31 of the master information carrier 3 is of pure Ni or Ni—Co containing therein a slight amount of Co, the coefficient of thermal expansion of the base sheet 31 of the master information carrier 3 is stabilized at about 13 $(12.8~13.3) \times 10^{-6}/°$ C. For example, the coefficient of thermal expansion of the base sheet 31 of the master information carrier 3 formed of an Ni—Co alloy containing therein 99.87% of Ni and 0.13% of Co is $13.3 \times 10^{-6}/°$ C.

When the base sheet 31 of the master information carrier 3 is of Fe—Co—Ni containing therein 60 at % or more of Ni, the coefficient of thermal expansion of the base sheet 31 of the master information carrier 3 is stabilized at about $12 \times 10^{-6}/°$ C. That is, as can be seen from FIG. 2, the coefficient of thermal expansion of Fe—Co—Ni alloy containing therein 60 at % or more of Ni is about $12 \times 10^{-6}/°$ C. For example, when the Ni content is 60 to 99.87%, the coefficient of thermal expansion is 12 to $13.3 \times 10^{-6}/°$ C.

The coefficient of thermal expansion of the base sheet of the slave medium 2 is $5~8 \times 10^{-6}/°$ C. when the slave medium 2 is a hard disc having a base sheet of glass, is $20~23 \times 10^{-6}/°$ C. when the slave medium 2 is a hard disc having a base sheet of aluminum, and is $10~25 \times 10^{-6}/°$ C. when the slave medium 2 is a flexible disc having a base sheet of PET. These coefficients of thermal expansion of the base sheet 31 of the master information carrier 3 and the base sheet of the slave $\leqq$medium 2 satisfy $0.3 \leqq B/A \leqq 2.1$. The anisotropy of the PET base sheet, that is, the difference between a maximum coefficient of thermal expansion and a minimum coefficient of thermal expansion in various directions parallel to the surface of the master information carrier 3 to be brought into contact with the slave medium 2, is $0.1~8 \times 10^{-6}/°$ C.

When the coefficient of thermal expansion of the base sheet 31 of the master information carrier 3 is in the aforesaid range, even if the magnetic transfer is effected with the master information carrier 3 and the slave medium 2 at different temperatures held in a close contact with each other, shift of the position of the transferred signal on the slave medium 2 from the correct position where the transferred signal is to be positioned due to the temperature difference can be suppressed, whereby the positioning accuracy of the transferred signal can be ensured and the reliability is improved. Accordingly, the temperature difference between the mastering step and the magnetic transfer step is accepted to some extent, which alleviates the environmental temperature requirement during the magnetic transfer step and facilitates the temperature control. Further, since the coefficient of thermal expansion of the master information carrier 3 and the coefficient of thermal expansion of the slave medium 2 both meet the requirement of the drive, the drive can optimally read the signal on the slave medium 2.

Though may be suitably formed of nickel alloys as described above, the base sheet 31 of the master information carrier 3 may be formed of aluminum or other alloys so long as its coefficient of thermal expansion satisfies the aforesaid conditions.

The irregularity pattern on the base sheet 31 can be formed, for instance, by the use of stamper. For example, photo-resist layer is first formed on a smooth glass plate (or a smooth crystal plate), for instance, by spin coating, and a laser beam (or an electron beam) modulated according to the servo signal is projected onto the photo-resist layer while rotating the glass plate so that the photo-resist layer is exposed to the laser beam in a predetermined pattern, e.g., a pattern of a servo signal. Thereafter the photo-resist layer is developed and the part exposed to the laser beam is removed with an irregularity pattern of the photo-resist left on the glass plate, thereby obtaining a matrix. Then the surface of the matrix is plated (electroforming), and a base sheet having a positive irregularity pattern is formed on the matrix and separated from the matrix. The depth of the irregularity pattern (the height of the protruding portion) on the base sheet 31 is preferably 80 nm to 800 nm, and more preferably 100 nm to 600 nm.

Otherwise, the matrix may be plated to form a second matrix and the second matrix may be plated to form a base sheet having a negative irregularity pattern. Further, a third matrix may be formed by plating the second matrix or pressing a resin syrup against the surface of the second matrix and curing the resin syrup, and a base sheet having a positive irregularity pattern may be formed by plating the third matrix.

Further, a matrix without photo-resist layer may be first formed by etching the glass plate with an irregularity pattern of the photo-resist to make holes in the glass plate, and a base sheet may be formed by the use of the matrix in the manner described above.

The magnetic layer 32 of the master information carrier 3 may be formed by various vacuum film forming techniques or plating methods such as vacuum deposition, sputtering, ion plating and the like of magnetic material. The magnetic layer 32 may be formed of, for instance, Co, Co alloys (e.g., CoNi, CoNiZr, CoNbTaZr), Fe, Fe alloys (e.g., FeCo, FeCoNi, FeCoNiMo, FeAlSi, FeAl, FetaN) Ni, Ni alloys (e.g., NiFe). It is especially preferred that the magnetic layer 32 be formed of FeCo or FeCoNi. The thickness of the magnetic layer 32 is preferably 50 nm to 500 nm, and more preferably 100 nm to 400 nm.

Also when the information is transferred by perpendicular recording, a master information carrier substantially the same as that employed when the information is transferred by in-plane recording may be employed. In the case of the perpendicular recording, the slave medium 2 is first magnetized in a direction perpendicular to the tracks (initial DC magnetization) and a transfer magnetic field is applied to the master information carrier 3 and the slave medium 2 in close contact with each other in a direction opposite to the initial DC magnetization. The transfer magnetic field is absorbed in the magnetic layer 32 on the upper surface of the protruding portions of the irregularity pattern on the surface of the base sheet 31 and a magnetization pattern corresponding to the irregularity pattern on the master information carrier 3 is transferred to the slave medium.

A magnetic field generation means for applying the initial magnetic field and the transfer magnetic field comprises a pair of ring type electromagnets each disposed on one side of the slave medium 2 and the master information carrier 3 in a close contact with each other. Each of the electromagnets comprises a core having a gap extending in a radial direction of the slave medium 2 and a winding wound around the core. In the case of the in-plane recording, the ring type electromagnets on opposite sides of the slave medium 2 and the master information carrier 3 in a close contact with each other applies magnetic fields in the same direction in parallel to the tracks. The magnetic field generation means applies a magnetic field to the slave medium 2 and the master information carrier 3 while rotating a holder which holds the slave medium 2 and the master information carrier 3 in a close contact with each other. Instead of rotating the holder, the magnetic field generation means may be rotated. A ring type electromagnet may be disposed on one side of the slave medium 2 and the master information carrier 3 or on each side of the same. A permanent magnet may be employed in place of the electromagnets.

In the case of the perpendicular recording, a pair of electromagnets or a permanent magnets different in polarity are disposed on opposite sides of the holder and a magnetic field is generated in perpendicular to the tracks. When the magnetic field generation means is of a type which applies a magnetic field only a part of the slave medium 2 and the master information carrier 3, the holder and the magnetic field are moved with respect to each other so that a magnetic field is applied to the slave medium 2 and the master information carrier 3 over the entire area thereof.

The slave medium 2 may be, for instance, a one-sided or double-sided flexible disc or a one-sided or double-sided hard disc. The base sheet of the flexible disc is generally of plastic film such as of PET, PEN or aramid whereas the base sheet of the hard disc is of a hard sheet such as of glass or aluminum. The magnetic layer thereof is generally of a coated magnetic material or a metal film. In the case of a slave medium having a magnetic layer of metal film, the material of the magnetic layer may be Co, Co alloy (e.g., CoPtCr, CoCr, CoPtCrTa, CoPtCrNbTa, CoCrB, CoNi,), Fe or Fe alloy (e.g., FeCo, FePt, FeCoNi). It is preferred in view of obtaining clearer magnetic transfer that the magnetic layer be higher in magnetic flux density and has a magnetic anisotropy conforming to the recording system of the slave medium, that is, in the case of an in-plane recording medium, in a direction parallel to the direction of tracks and in the case of a perpendicular recording medium, in a direction perpendicular to the direction of tracks. It is further preferred that the magnetic layer of the slave medium 2 be provided with a non-magnetic primer layer on the base sheet side thereof in order to give the magnetic layer a necessary magnetic anisotropy. The primer layer should match to the magnetic layer in crystallographic structure and lattice constant. For this purpose, the primer layer may be, for instance, of Cr, CrTi, CoCr, CrTa, CrMo, NiAl, Ru or the like.

Experiments

The amounts of shift of the position of the transferred signal due to the temperature difference between the mastering step and the magnetic transfer step were obtained for master information carriers in accordance with first to seventh embodiments of the present invention and master information carriers of the first to third comparative examples under various conditions shown in the following table. In these experiments, the mastering temperature was controlled to 25° C.±0.1° C. for all the master information carriers, a irregularity pattern representing a signal was formed on each master information carrier in a position (reference position) at a distance of 40 mm from its center, and the signal was transferred to slave media 95 mm in outer diameter. The transferred signal was developed by a magnetic developer and the radius of its track signal was measured by the use of a two-dimensional shape meter at a temperature of 25° C.±0.1° C. and the amount of shift from the reference position was calculated. The result is shown in the following table. In the table, the coefficient of thermal expansion is an average of coefficients of thermal expansion in different directions over the entire circumference and the difference between the maximum of the coefficients of thermal expansion and the minimum of the coefficients of thermal expansion is taken as the directional difference in thermal expansion (to be described later). In the table, "ex" is an abbreviation of "experiment", "emb" is an abbreviation of "embodiment", "c/e" is an abbreviation of "comparative example", "CT" is an abbreviation of "coefficient of thermal expansion", "BS" is an abbreviation of "base sheet", "MC" is an abbreviation of "master information carrier", "SM" is an abbreviation of "slave medium" and "MT temp" is an abbreviation of "magnetic transfer temperature".

First to Third Experiments

Master information carriers having a base sheet which was of Ni (100%) and was electroformed by the stamper method were used. The coefficients of the base sheets were as shown in the following table. Flexible discs formed by coating a magnetic layer on each side of a PET film (62 μm thick) were used as the slave media. The coefficients of the base sheets were as shown in the following table and were the same as those of the master information carrier. In the experiments 1 to 3, the magnetic transfer temperatures were respectively set to 23° C., 25° C. and 30°C.

As can be seen from the following table, in any one of the first to third experiments, where the master information carrier and the slave medium were equal to each other in coefficient of thermal expansion, the signal was transferred to the slave medium in place and the amount of shift was 0 since the master information carrier and the slave medium expanded at the same rates.

Fourth Experiment

The base sheet of the slave medium was formed of PET film produced in a lot different from the PET of the base sheets of the slave media employed in the first to third experiments and was stamped out from an end portion of the raw sheet. The coefficient of thermal expansion of the base sheet was large as shown in the following table. The directional difference in thermal expansion of the base sheet of the slave medium was $7\times10^{-6}/°$ C. By the influence of stretching, the coefficient of thermal expansion and the directional difference in thermal expansion were different from the base sheets of the slave media employed in the first to third experiments. Except those described above, the fourth experiment was performed in the same manner as the third experiment. The magnetic transfer temperature was 30° C.

As can be seen from the following table, because of the difference in coefficient of thermal expansion between the master information carrier and the slave medium and the difference of 5° C. between the mastering temperature (25° C.) and the magnetic transfer temperature (30° C.), the signal was transferred to the slave medium in a position shifted from the correct position by 2.2 μm on average.

Fifth and Sixth Experiments

The slave medium was a hard disc in either of the fifth and sixth experiments. In the fifth experiment, the base sheet was of glass and in the sixth experiment, the base sheet was of aluminum. The coefficients of thermal expansion of the base sheets were as shown in the following table. Except those described above, the fifth and sixth experiments were performed in the same manner as the third experiment.

As can be seen from the following table, because of the difference in coefficient of thermal expansion between the master information carrier and the slave medium and the difference of 5° C. between the mastering temperature (25° C.) and the magnetic transfer temperature (30° C.), the signal was transferred to the slave medium in a position shifted from the correct position by 1.04 μm on average and 1.8 μm on average, respectively, in the fifth and sixth experiments.

As can be seen from the following table, because of the difference in coefficient of thermal expansion between the master information carrier and the slave medium (significant in ninth and tenth experiments) and the difference of 5° C. between the mastering temperature (25° C.) and the magnetic transfer temperature (30° C.), the signal was transferred to the slave medium in a position shifted from the correct position by 1.06 μm on average, 3.9 μm on average, and 4.3 μm on average respectively, in the eighth to tenth experiments.

As described above, the master information carriers employed in the first to seventh experiments were in accordance with the present invention. That is, in accordance with the present invention, the base sheet of the master information carrier is in the range of 5~25×10$^{-6}$/° C. and is formed of, for instance, Ni or FeCoNi, and is not formed of Si.

TABLE

|      |       | BS/MC  |                      | BS/SM    |                      |      | MT          |             |
|------|-------|--------|----------------------|----------|----------------------|------|-------------|-------------|
|      |       |        | CT/A 10$^{-6}$/° C.  |          | CT/A 10$^{-6}$/° C.  | B/A  | temp ° C.   | shift μm    |
| ex1  | emb 1 | Ni     | 13                   | P E T    | 13                   | 1    | 23          | 0           |
| ex2  | emb 2 | Ni     | 13                   | P E T    | 13                   | 1    | 25          | 0           |
| ex3  | emb 3 | Ni     | 13                   | P E T    | 13                   | 1    | 30          | 0           |
| ex4  | emb 4 | Ni     | 13                   | P E T    | 24                   | 1.8  | 30          | 2.2         |
| ex5  | emb 5 | Ni     | 13                   | glass    | 7.8                  | 0.6  | 30          | 1.04        |
| ex6  | emb 6 | Ni     | 13                   | aluminum | 22                   | 1.7  | 30          | 1.8         |
| ex7  | emb 7 | FeCoNi | 12                   | glass    | 7.8                  | 0.65 | 30          | 0.84        |
| ex8  | c/e 1 | Si     | 2.5                  | glass    | 7.8                  | 3.1  | 30          | 1.06        |
| ex9  | c/e 2 | Si     | 2.5                  | aluminum | 22                   | 8.8  | 30          | 3.9         |
| ex10 | c/e 3 | Si     | 2.5                  | P E T    | 24                   | 9.6  | 30          | 4.3         |

Seventh Experiment

A master information carrier having a base sheet which was of FeCoNi containing therein 60% of Ni was used. The coefficient of the base sheet was as shown in the following table. The base sheet of the slave medium was of glass. Except those described above, the seventh experiment was performed in the same manner as the third experiment.

As can be seen from the following table, because of the difference in coefficient of thermal expansion between the master information carrier and the slave medium and the difference of 5° C. between the mastering temperature (25° C.) and the magnetic transfer temperature (30° C.), the signal was transferred to the slave medium in a position shifted from the correct position by 0.84 μm average.

Eighth to Tenth Experiments

Master information carriers having a base sheet which was of Si and on which a pattern was formed by lithography were used. The coefficients of the base sheets were as shown in the following table. The slave medium was a hard disc in either of the eighth and ninth experiments and a flexible disc in the tenth experiment. In the eighth experiment, the base sheet was of glass and in the ninth experiment, the base sheet was of aluminum. In the tenth experiment, the base sheet of the flexible disc was of PET. The coefficients of thermal expansion of the base sheets were as shown in the following table. Except those described above, the eighth to tenth experiments were performed in the same manner as the third experiment.

What is claimed is:

1. A master information carrier which comprises a base sheet provided with a pattern representing a signal and a magnetic layer formed on the pattern and is for transferring the signal to a slave medium in a close contact with the master information carrier, wherein
    the coefficient of thermal expansion of the base sheet of the master information carrier is in the range of 5×10$^{-6}$/° C. to 25×10$^{-6}$/° C., and
    the thermal expansion difference in different directions of the base sheet of the master information carrier is not larger than 8×10$^{-6}$/° C.

2. A master information carrier as defined in claim 1 in which the coefficient of thermal expansion of the base sheet of the master information carrier is in the range of 10×10$^{-6}$/° C. to 15×10$^{-6}$/° C.

3. A master information carrier as defined in claim 1 which the base sheet of the master information carrier is of pure Ni or Ni—Co containing therein a slight amount of Co.

4. A master information carrier as defined in claim 1 in which the base sheet of the master information carrier is of Fe—Co—Ni containing therein 60% or more of Ni.

5. A master information carrier as defined in claim 1 in which the ratio B/A of the coefficient B of thermal expansion of the base sheet of the slave medium to the coefficient A of thermal expansion of the base sheet of the master information carrier is in the range of 0.3 to 2.1.

* * * * *